Patented July 28, 1942

2,291,507

UNITED STATES PATENT OFFICE 2,291,507

HORTICULTURAL SPRAY OILS

Wesley H. Sowers, Flossmoor, Ill., assignor to The Pure Oil Company, Chicago, Ill., a corporation of Ohio No Drawing. Application June 14, 1939, Serial No. 279,057

4 Claims. (Cl. 167—28)

This invention relates to spray compositions useful in the control of parasiticidal growths frequently encountered in horticultural work.

Spray compositions for control of parasites in horticultural work may be either of the type that is emulsified with water or of the type that is used straight, that is, without the addition of water and emulsifying agent. In either case it is the hydrocarbon oil component of the treating agent that is the active ingredient which acts to kill and exterminate the parasite.

Some parasitic growths are particularly hard to kill and recourse has been had to the use of higher quantities of oil and to oil of higher viscosity. However, it has been found, as pointed out by Lindstaedt in United States Patent No. 2,134,136, that quantity of oil and viscosity of oil are not the best criteria of the efficacy of spray compositions. The use of too great a quantity of oil is not only costly but usually acts adversely on the plant structure, the oil being absorbed into the vascular system of the plant. By retaining a relatively light film of oil on the surface of the plant for a relatively long period of time, a very effective kill of the parasite may be obtained.

It is an object of this invention to provide improved spray compositions which will not penetrate plant structures to an undesirable extent.

It is a further object of this invention to provide spray compositions of improved parasiticidal properties.

Another object of this invention is to provide spray compositions which are stable under storage conditions and free of tendency to develop odors and/or rancidity.

Other objects and advantages will be apparent from the following detailed description of the invention.

I have found that hydrocarbon polymers when incorporated into spray compositions composed chiefly of petroleum or hydrocarbon oils, particularly refined oils of low viscosity, or emulsions thereof, prevent or materially retard the penetration of the hydrocarbon oil into the plant structure. Hydrocarbon polymers suitable for use according to my invention are those polymers that have drying characteristics when exposed in films to the atmosphere. Such polymers may be obtained in the course of refining petroleum distillates. Polymers which are particularly suitable for my invention are those prepared by subjecting low boiling cracked petroleum distillates to treatment with fuller's earth or similar adsorptive polymerizing catalyst at temperatures approximating 250° F. to 700° F. but below cracking temperature, under superatmospheric pressure of 200 to 2000 pounds per square inch. Under these conditions, unstable constituents in the distillate are polymerized to high boiling compounds which oxidize when exposed in films to the atmosphere to form dry coatings. Polymers prepared in this manner are preferably first reduced by vacuum and/or steam below cracking temperatures, to a viscosity of approximately 200 to 350 seconds Saybolt Universal viscosity at 210° F. Such polymers may have an iodine value of 150 to 250 and will generally dry dust-free in films within four to eight hours. Representative tests of such polymers after being reduced are given in Table I:

Table I

| | |
|---|---|
| Gravity, A. P. I. | 10.8 |
| Flash | 340 |
| Fire | 385 |
| Viscosity, S. U. @ 210° F | 342 |
| Color, N. P. A. | *5½ |
| Iodine number | 205 |
| Drying time, dust-free, hours | 5 |

*1 g. polymers diluted with 99 cc. kerosene of minimum +25 Saybolt color.

Polymers produced by other methods of treating unrefined cracked distillates as well as other hydrocarbon polymers, such as those obtained in the polymerization of gas, are also useful, provided they possess the ability to decrease the penetrability of mineral oil.

Mineral oils useful for my compositions may be chosen from a wide variety of grades; preferably, however, I use refined oils of Western or Gulf Coast type and of a viscosity such as is generally included in the classification of non-viscous neutrals. Neutrals of this class are generally within a viscosity range of 45 to 100 seconds at 100° F. Saybolt Universal and I prefer to use oils in the range of 60 to 85 seconds.

The incorporation of hydrocarbon polymers into spray compositions in accordance with my invention will cause the sprayed material to oxidize to a substantially odorless, tacky film which will remain upon the plant for a much longer period of time than the usual spray oils and at the same time there will not be an undesirable penetration into the plant structure. In this manner the hydrocarbon polymers function to reduce the tendency of the spray material to penetrate and simultaneously give the sprayed coating greatly enhanced weathering properties whereby the film remains for a much longer time on the plant structure, thereby materially improving the efficacy of the composition as a parasiticide.

A direct measure of the penetration retarding effect of a number of additives on spray compositions has been developed and is set forth in the United States Patent No. 2,134,136, issued to Lindstaedt. The method therein set forth describes a laboratory test for determining the penetration control value of a number of animal and vegetable oils and soaps. The penetration control value is an arbitrary value which is the difference in hundredths of an inch, expressed in units, between the vertical rise in standard test strips of a straight mineral oil arbitrarily taken as a standard and the same oil to which has been added one or more of various selected penetration inhibitors. For example, with a straight mineral oil of 65 to 70 viscosity S. U. at 100° F., the vertical rise in the standard test strips at room temperature is 1.47 inches. At the same temperature and using the same mineral oil to which has been added 12% by volume of hydrocarbon polymers, the vertical rise is 1.35 inches. The latter mixture penetrates 0.12 inch less than the straight oil and is said to have a penetration control value of 12. The following table indicates the nature of the results obtained:

*Table II*

| Material | Penetration control value |
| --- | --- |
| 65/70 mineral oil (testing standard) | 0 |
| 65/70 mineral oil plus 12% hydrocarbon polymers | 12 |
| 65/70 mineral oil plus 20% hydrocarbon polymers | 28 |
| 65/70 mineral oil plus 12% boiled linseed oil | −6 |
| 65/70 mineral oil plus 20% boiled linseed oil | 6 |
| 65/70 mineral oil plus 12% blown menhaden oil | 6 |

In the course of the early investigational work on this subject, hydrocarbon polymers of low viscosity and of relatively long drying time were tested to determine their efficacy for retarding the penetration of low viscosity mineral oil and it was found that in proportions of 12% or lower there was either no beneficial effect or the penetrating characteristics were actually increased. Yet 12% of my preferred polymers show a penetration control value of 12. It is apparent that such low viscosity polymers are not within the scope of this invention.

It will thus be seen that I have provided a means of materially reducing the penetration effect of spray compositions. It is also to be noted that the penetration inhibiting effect of hydrocarbon polymers is materially in excess of that obtained with boiled linseed oil or blown menhaden oil. Furthermore, hydrocarbon polymers have substantially no taste and do not develop free fatty acids or rancidity, either upon storage in containers or under conditions of use. This characteristic which is more or less prevalent in all animal and vegetable oils gives rise to highly undesirable tastes and odors, a feature which is particularly undesirable for fruit trees or similar growths where the edible portions may come in contact with the spray compositions. Hydrocarbon polymers are also free from tendency to develop and support bacterial growths whereas animal and vegetable oils are prone to exhibit this tendency. The bacterial growths give rise to undesirable and unpleasant odors.

While I have set forth several specific mixtures of hydrocarbon polymers with mineral oil, it is to be understood that the inhibiting effect of hydrocarbon polymers on spray compositions in general is not limited to the proportions shown. The penetration effect of the hydrocarbon polymers may be varied in accordance with the quantity used, the drying properties of the polymers and the composition of the particular spray mixture in which they are a component part. Generally I use not substantially in excess of 25% of hydrocarbon polymers and preferably between approximately 10% and 25% of polymers. As previously indicated, the spray compositions may be used straight or emulsified with water. Hydrocarbon polymers suitable for use according to my invention are polymers having the property of drying to tough films upon exposure to the atmosphere in thin layers.

I claim:

1. A composition of matter useful in the control of parasitic growths comprising a substantial amount of hydrocarbon oil and not substantially less than 12% by volume of hydrocarbon polymers having approximately the following tests:

Iodine value _____ 150 to 250
Drying time, dust free, hours _____ 4 to 8
Viscosity, S. U. at 210° F _____ 200 to 350

2. Composition in accordance with claim 1 in which the hydrocarbon polymers are present in amounts of from 12 to 25% by volume.

3. Method of treating plant growths for protection against parasites which comprises applying to said growths a mixture comprising a substantial amount of hydrocarbon oil and not less than 12% by volume of hydrocarbon polymers having approximately the following tests:

Iodine value _____ 150 to 250
Drying time, dust-free, hours _____ 4 to 8
Viscosity, S. U. at 210° F _____ 200 to 350

4. Method in accordance with claim 3 in which the polymers are present in the mixture in an amount between 12 and 25% by volume.

WESLEY H. SOWERS.